Feb. 15, 1938.  T. ZUSCHLAG  2,108,463
APPARATUS FOR ELECTRICAL PROSPECTING
Filed June 25, 1936
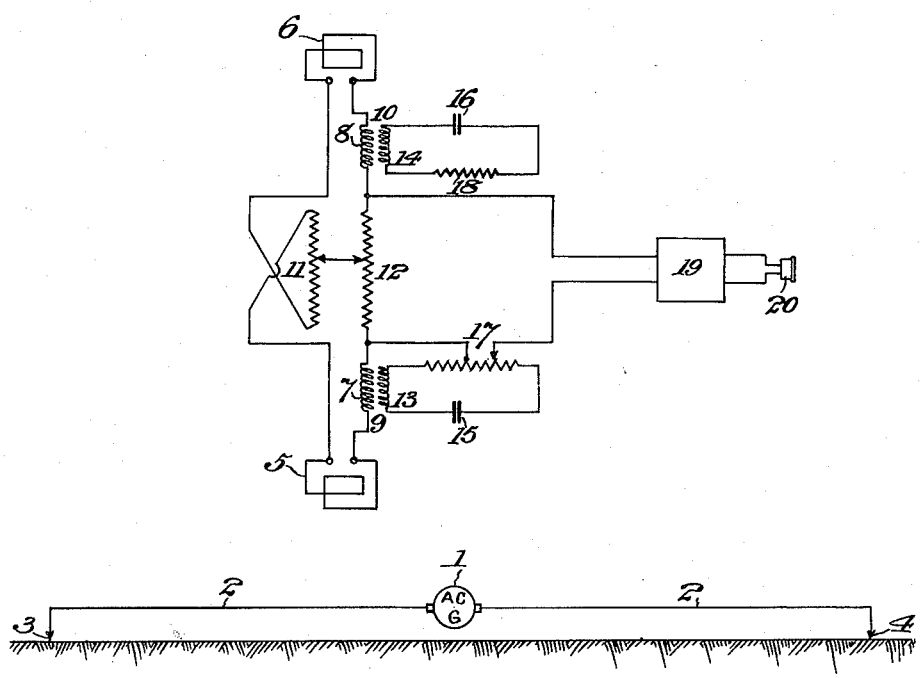
INVENTOR
Theodor Zuschlag
BY
his ATTORNEYS Patented Feb. 15, 1938

2,108,463

UNITED STATES PATENT OFFICE 2,108,463

APPARATUS FOR ELECTRICAL PROSPECTING

Theodor Zuschlag, West Englewood, N. J., assignor to Hans T. F. Lundberg, Montreal, Quebec, Canada Application June 25, 1936, Serial No. 87,230

4 Claims. (Cl. 175—182)

This invention relates to the art of electrical prospecting in respect to minerals in the earth, and more particularly involves a method of and apparatus for investigating and determining the nature and characteristics of alternating magnetic ground fields artificially created in the earth.

It is well known to those skilled in this art that the nature and characteristics of such artificially created ground fields is dependent upon and varies with the nature and characteristics of the earth that is permeated by and lies within the effective range of such ground fields. This established fact may be utilized when it is desired to determine the nature and, particularly, the subterranean character of certain sections of the earth, by artificially setting up within the said sections of the earth electric and electromagnetic ground fields, then systematically analyzing the resultant structure of said ground fields, and finally interpreting the geological significance of the resultant structure in respect to its relation to the sections of the earth that are being investigated.

The better known and most followed procedures designed to accomplish the above described result involve the use of one of more pick-up or search coils, and aim at determining the ratio of electromagnetic field strength in one or more planes at one or more locations. For instance, one well known procedure utilizes two frames or coils that are connected in opposition to an indicator, the resultant deflections of the indicator being reduced to zero by suitably rotating one of said coils until the electromotive force induced in the said coil equals the electromotive force induced in the other coil which is disposed in an arbitrary plane and at an arbitrary location.

Without going into technical details, it may be stated that the ratio of the effective field strengths acting in a direction perpendicular to such arbitrarily fixed and located planes, may be computed as a function of the number of turns of said coils as well as of the angle of compensation required to produce zero deflection of the indicator. This procedure or mode of investigation, while comparatively simple, is not highly accurate because it includes no provision to compensate for a phase displacement of the two field strength values of which the ratio is to be determined. Quite often, the failure to make provision for compensation of said phase displacement makes impossible the obtaining of a sharp minimum adjustment of the angle of compensation and, thus, may lead to an uncertain or inaccurate determination of the field strength ratio that is being investigated.

It is generally practicable to avoid difficulties of the character just described by making use of an auxiliary balancing network to which the pick-up or search coils are connected, which auxiliary balancing network provides means to adjust the apparatus not only for the ratio but also for the phase variation of the field strengths that are being investigated. However, such auxiliary balancing networks usually include variable impedance circuits which do not possess a great range of operation, and which do not readily yield the final desired result by a simple evaluation of a single adjustment. The reason for this last named deficiency lies in the fact that, in networks of the type generally employed for these purposes, any compensation for different ratios of the induced electromotive force usually is dependent upon the condition that the same ratio also holds true with respect to the impedances contained in the various branches of the compensating network. It will be readily understood that this last named condition or requirement renders it quite difficult to measure ratios which vary substantially from unity, because it is apt to become quite difficult to effect or obtain corresponding impedance ratios, particularly when using inductive impedance combinations.

It is a primary object of this invention to overcome the handicaps and deficiencies above described by providing a new balancing method and network apparatus that eliminates these drawbacks; which method and apparatus is adapted for accurate determination of the ratio and phase displacement of field strength values in ground fields that have been artificially created in the earth for electrical prospecting purposes.

My new network apparatus is primarily characterized by the fact that the values of the impedances incorporated in the balancing circuit remain constant and are independent of the electromotive force ratio that is to be measured. This improvement in the said apparatus not only makes it possible to simplify the operation of the balancing network but also, within reasonable limits, directly to translate or evaluate the setting of the balance adjustment into elecromotive force ratio or field strength ratio. As a result of this improvement my network apparatus is especially useful and desirable for that large class of operators or investigators who are not specifically or thoroughly trained in electric engineering.

A practical embodiment of apparatus including my new balancing network is diagrammatically represented in the accompanying drawing, in which a suitable generator for alternating current is denoted by 1, and is connected by means of the exciter wires 2, 2 to ground contacts 3 and 4 that are suitably spaced from each other. The arrangement just described constitutes an exciter circuit and is calculated to set up an electric and electromagnetic ground field between the points 3 and 4. In order to investigate the field strength disposition of said ground field, two search or pick-up coils 5 and 6, each consisting of an identical number of insulated copper wires, are located at arbitrarily selected points transverse to arbitrarily selected components of the field strength to be compared.

The said coils 5 and 6 are connected in series with the primaries 7 and 8 of phase shift transformers 9 and 10, and to the ends of two identical potentiometers which are denoted by 11 and 12. The said transformers are preferably of the air core type, as this somewhat simplifies part of the mathematical calculations in using the apparatus; although transformers of the iron core type are operative in this apparatus.

The sliders of the two potentiometers are directly connected with each other and mechanically coupled in such a manner that a shift of the sliders to the left or right, in the drawing, does not change the total impedance of the circuits 5, 7, 11 and 12 on the one hand, and 6, 8, 11 and 12 on the other hand. In order to maintain this condition, the secondaries 13 and 14 of the phase transformers 9 and 10 are connected to two electrically identical circuits, each of which consists of a condenser and a resistance of equal value. The secondary 13 is connected to the fixed condenser 15 and to a center tapped potentiometer 17; while the secondary 14 is connected to the fixed condenser 16 and to the fixed resistance 18. The center of potentiometer 11 is connected to the common point of potentiometer 12 and the primary 7, while the slider of potentiometer 17 and the other end of potentiometer 12 are connected to the input of an amplifying device 19, which is of suitable standard construction. The output of the amplifier 19 is connected to an optical or acoustical indicator 20, which may also be of suitable standard construction.

In carrying out my improved method by use of the apparatus just described, the search coils 5, 6 are connected in such a manner as to cause opposing current flow through the different sections of potentiometers 11 and 12, under which condition the normal deflection or reading of the indicating device 20 may be reduced to zero by suitable movement of the sliders of potentiometers 11, 12, and the slider of potentiometer 17.

If the two electromotive forces induced in coils 5, 6 are not phase displaced, then it is not necessary to introduce a phase compensating complement by operation of the potentiometer 17, and the slider of potentiometer 17 will come to rest upon the center tap connection. In this case, the ratio of the two portions of potentiometer 12, as defined by the location of contact point, directly represents the ratio of the two electromotive forces and, further, the ratio of the two field intensities which induce these electromotive forces in coils 5, 6.

This last assertion may be demonstrated by a mathematical calculation, which uses the designations $E_5$ to represent the electromotive force induced by field intensity $H_5$ in coil 5

$E_6$ to represent the electromotive force induced by field intensity $H_6$ in coil 6

$d_7$ and $d_8$ to represent the equal impedances of transformer primaries 7 and 8

$d_5$ and $d_6$ to represent the equal impedances of the search coils 5 and 6

$a_{11}$ and $a_{12}$ to represent the two sections of potentiometers 11 and 12 connected in circuit with coil 5

$b_{11}$ and $b_{12}$ to represent the two sections of potentiometers 11 and 12 connected in circuit with coil 6

$c_{17}$ to represent the section of potentiometer 17 enclosed between the centertap and the slider of this potentiometer $I_5$ and $I_6$ to represent the currents set up by the electromotive forces $E_5$ and $E_6$ and $I_{17}$ to represent the current through potentiometer 17.

With this premise, the following equation prevails for zero deflection of the indicator:

(1) $\qquad I_5 a_{12} - I_6 b_{12} + I_{17} c_{17} = 0$

In this equation the values of $I_5$, $I_6$ and $I_{17}$ are given by the expressions:

$$I_5 = \frac{E_5}{d_5 + d_7 + a_{11} + a_{12}}$$

$$I_6 = \frac{E_6}{d_6 + d_8 + b_{11} + b_{12}}$$

and $I_{17} = k I_5$ where $k$ is the complex relation $$\frac{I_{17}}{I_5}$$

Considering the fact that $d_5 = d_6$, $d_7 = d_8$ and $a_{11} + a_{12} = b_{11} + b_{12}$ the two expressions for $I_5$ and $I_6$ may be written:

$$I_5 = \frac{E_5}{C} \text{ and } I_6 = \frac{E_6}{C}$$

where C is the constant impedance of the two network branches.

Substituting these various expressions in Equation (1), the following equation obtains:

(2) $\qquad \frac{E_5}{C} a_{12} - \frac{E_6}{C} b_{12} + \frac{E_5}{C} k c_{17} = 0$ Cancelling the constant impedance value C and dividing with the value of $E_5$, this equation may be written:

(3) $\qquad \frac{E_6}{E_5} = \frac{a_{12}}{b_{12}} + k \frac{c_{17}}{b_{12}}$

This equation indicates that the electromotive force ratio $E_6/E_5$, and therefore the field strength ratio $H_6/H_5$, is directly proportional to the potentiometer ratio $a_{12}/b_{12}$ whenever the value of potentiometer section $c_{17}$ approaches zero. As already stated, this condition occurs whenever the two field intensities $H_6$ and $H_5$ are in phase or only slightly phase displaced from each other. Experience has shown that this is the rule rather than the exception, and that in most cases it is quite admissible to neglect the numerical value of the second expression in Equation 3 and compute the electromotive force ratio solely from the potentiometer ratio $a_{12}/b_{12}$. On the other hand, this statement does not imply that the adjustment of potentiometer 17 is of no importance for the purpose of obtaining zero deflection of the indicator. In fact, without help from the phase displaced current component introduced by adjustment of potentiometer 17, it frequently is difficult, if not impossible, to establish such zero deflection of the indicator.

After having thus obtained the value of the field strength ratio at points 5 and 6, the apparatus, including the search coils, may be moved to another combination of points and the above described operation repeated. By systematically proceeding in this manner, the ground to be investigated may be easily covered with a network of points of known field intensity ratio, which then may be interpreted, by any well known and approved method, to determine its geological meaning with respect to the ground thus explored.

I have found that, in field operations, it is often desirable and advantageous to employ the subject matter of this application in connection or in combination with the subject matter of my application, Serial No. 723,669, filed May 3, 1934, now Patent No. 2,062,630, of Dec. 1, 1936. This enables the exploration to be conducted on the basis of both ground potential and electromagnetic field investigations.

While I have set forth, in the foregoing, a specific form of apparatus and have detailed specifically a method of using the same to obtain the desired results, I do not intend to be limited to the details of apparatus or steps thus described, since my invention contemplates the practicability of resorting to equivalents both in the apparatus and in the method of procedure. Hence, I intend the claims to be construed as broadly as may be in the light of the existing prior art.

What I claim is:

1. Apparatus of the character described comprising, a plurality of pick-up coils, a plurality of potentiometers, and a plurality of phase transformers, said elements being electrically connected in such a way that current induced in the coils produces a potential across the potentiometers and energizes the transformers, and the sliders of said potentiometers being connected with each other and movable in such a way that the impedance of each of the two coil circuits as a whole remains constant.

2. Apparatus of the character described comprising, a plurality of pick-up coils, a plurality of potentiometers, and a plurality of phase transformers, said elements being electrically connected in such a way that current induced in the coils produces a potential across the potentiometers and energizes the transformers, the sliders of said potentiometers being connected with each other and movable in such a way that the impedance of each of the two coil circuits as a whole remains constant, and an additional potentiometer having a slider electrically connected to the ends of one of the said first named potentiometers.

3. Apparatus of the character described comprising, a plurality of pick-up coils, a plurality of potentiometers, and a plurality of phase transformers, said elements being electrically connected in such a way that current induced in the coils produces a potential across the potentiometers and energizes the transformers, the sliders of said potentiometers being connected with each other and movable in such a way that the impedance of each of the two coil circuits as a whole remains constant, an additional potentiometer having a slider electrically connected to the ends of one of the said first named potentiometers, and an amplifying device having its input electrically connected to the slider of said additional potentiometer.

4. Apparatus of the character described comprising, a plurality of pick-up coils, a plurality of potentiometers, and a plurality of phase transformers, said elements being electrically connected in such a way that current induced in the coils produces a potential across the potentiometers and energizes the transformers, the sliders of said potentiometers being connected with each other and movable in such a way that the impedance of each of the two coil circuits as a whole remains constant, an additional potentiometer having a slider electrically connected to the ends of one of the said first named potentiometers, and an amplifying device having its input electrically connected to the slider of said additional potentiometer, the ends of said additional potentiometer being electrically connected with the ends of the secondaries of a said phase transformer.

THEODOR ZUSCHLAG.